June 7, 1949.  O. J. HUELSTER  2,472,771
REDUCTION DRIVE MECHANISM
Filed Dec. 12, 1945

INVENTOR
Otto J. Huelster.
BY
ATTORNEY

Patented June 7, 1949

2,472,771

UNITED STATES PATENT OFFICE 2,472,771

REDUCTION DRIVE MECHANISM

Otto J. Huelster, Waterbury, Conn., assignor to Scovill Manufacturing Company, Waterbury, Conn., a corporation of Connecticut Application December 12, 1945, Serial No. 634,458

9 Claims. (Cl. 74—242.9)

This invention relates to reduction drives for machines of various kinds and classes. More particularly, the invention deals with what might be termed drive units which can be readily coupled with various types and kinds of machines, particularly when it is desired to reduce the drive of the machine as compared with the normal speed of operation of standard motors used in the operation of the machine. Still more particularly, the invention deals with a belt and pulley drive unit wherein the drive pulley of the unit includes an internal gear driven from a pinion on a motor shaft, and in such manner as to maintain the drive belt taut at all times during the operation of the unit. The novel features of the invention will be best understood from the following descriptions when taken together with the accompanying drawing, in which certain embodiments of the invention are disclosed, and in which the separate parts are designated by suitable reference characters in each of the views and in which:

Figures 1, 2:
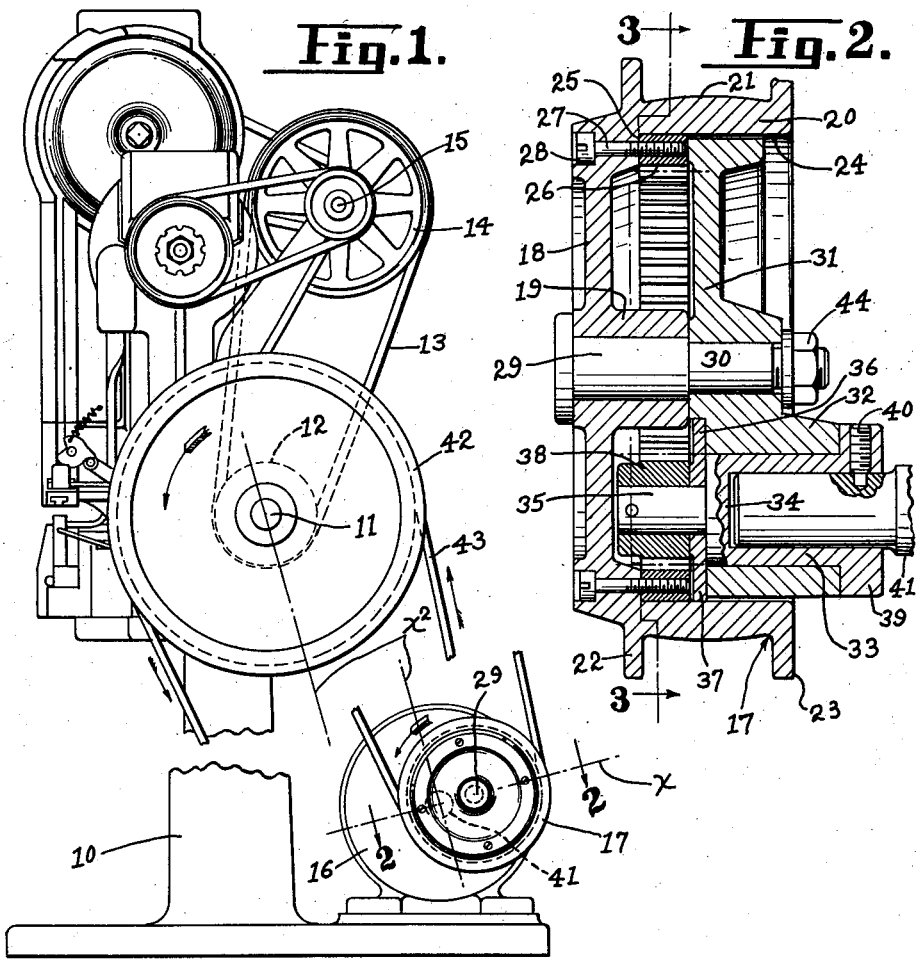
Fig. 1 is a side view of a unit made according to my invention, with parts of the construction broken away and showing diagrammatically a machine to which the unit is applied.
Fig. 2 is an enlarged sectional view on the line 2—2 of Fig. 1.
Figure 3:
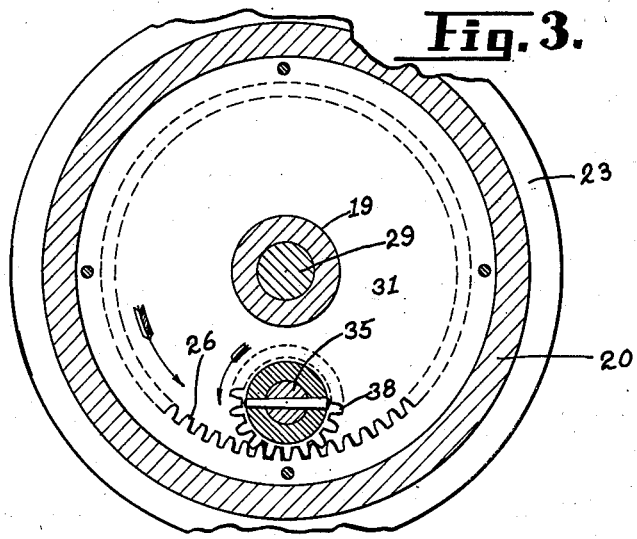
Fig. 3 is a section on the line 3—3 of Fig. 2, with parts of the construction broken away.

For the purpose of illustrating one adaptation and use of my invention, I have diagrammatically illustrated in Fig. 1, the side of a button fastener machine substantially of the type and kind disclosed in the patent to Warner et al., 1,499,270, granted June 24, 1924.

In Fig. 1 of the drawing, 10 represents the base of a button fastener machine of the kind defined. At 11 is shown the drive shaft of the machine from which the several mechanisms of the machine are actuated, for example, on the shaft is a small pulley 12 around which passes a belt 13, which passes over another pulley 14 on a shaft 15 and from the shaft 15 are other take-offs with which the present invention is not concerned, and for this reason, no further description of the machine structure will be made.

In machines of the type and kind under consideration it has been customary to drive the machine with specially constructed motors to operate at a predetermined R. P. M., for example, 1140 R. P. M. Maintaining such special motors, or a supply thereof to care for replacements or renewals when breakdowns occur has been a costly procedure, and oftentimes tied up the operation of a machine.

It is the purpose of my invention to utilize a standard motor, such as illustrated at 16, in Fig. 1 of the drawing, and to utilize in conjunction therewith a reduction drive unit whereby the machine in question will be actuated at the desired revolutions per minute and by varying the gear ratio as well as pulley ratio of the unit any predetermined revolutions per minute of a machine can be provided at a nominal cost. Thus if any fault occurs in the standard motor, such as the motor 16, a new or substitute motor can be readily installed.

My improved unit comprises a drive pulley 17, which as seen in Fig. 2 of the drawing is of more or less cup-shaped or dish-shaped cross sectional form. In other words, the pulley comprises a plate 18 having an elongated bearing or hub 19, the periphery of the plate having an annular flange 20 extending to one side thereof, the flange having a rounded outer surface 21 disposed between circumferential belt guiding ring portions 22 and 23. Within the chamber 24 of the pulley 17 is an annular seat or shoulder 25 arranged adjacent the plate 18 and also adjacent the flange 20.

Upon the shoulder 25 is seated an internal ring gear 26 which fits snugly in the chamber 24 and is secured in position by a plurality of screws 27 which pass through the wall 18, the heads 28 of the screws being preferably countersunk in the wall, as clearly shown in Fig. 2.

The hub portion 19 extends into the chamber 24 to a position to bring the inner end of the hub substantially in alinement with the outer surface of the internal ring gear. Mounted in the hub 19 is a pivot pin or shaft 29, to the reduced end 30 of which is secured a supporting frame 31. The frame 31, for the most part, fits within the chamber 24 and is free of the flange 20, the frame having in spaced relation to the pivot 29 an outwardly extending bearing portion 32 in which is arranged a bushing 33. The bushing is cup-shaped in cross sectional form. In other words, includes a closed end 34 from which protrudes a reduced stud 35.

Mounted on the stud 35 and seating upon the end 34 of the bushing and in a recess 36, in the frame 31 is a retaining washer 37. Pinned or otherwise secured to the stud outwardly of the washer 37 is a pinion 38 which is adapted to mesh with the internal gear 26. The bushing 33 has an annular enlarged collar portion 39 which seats upon the face of the bearing 32, and this in combination with the washer 37 retains the bushing and pinion assemblage against movement axially of the bearing 32. A set screw 40 is mounted in the collar portion 39 and adapted to engage the shaft 41 of the motor 16 in mounting the pulley unit 17 to swing on said shaft or the bushing 33 while at the same time providing free rotation of the motor shaft within the bearing in rotating the pulley through the pinion and internal gear construction employed.

Considering Fig. 1 of the drawing, it will appear that the pivot pin or shaft 29 is arranged at the right side of the motor shaft 41 and with its axis in a plane indicated by the dot and dash line X which is normally at right angles to the dot and dash line X—2 which runs from the center of the motor shaft 41 through the center of the shaft 11 on which the large driven pulley 42 of the machine is secured. A belt 43 passes around the pulleys 17—42 and in the operation of the motor 16, the belt is driven in the direction of the arrows, as seen in Fig. 1 of the drawing. As viewed in Fig. 1, the gear reduction unit is operated in a counter-clockwise direction, with the greater weight of the unit disposed to the right of the motor shaft 41. Consequently, when the machine is running during an idling state, the off-center weight of the unit will act as a weighted pulley so as to maintain the belt 43 in a normal taut state at all times. However, when the machine is set into operation to perform its required function, the added force for operating the machine will be transmitted to the left side of the belt in opposition to its direction of travel. This force in turn will be transmitted to the gear reduction unit on the motor shaft which will tend to rotate the unit about the motor shaft in a clockwise direction, and consequently further tighten up on the belt 43 when it is most needed, so as to prevent slippage and slapping of the belt. It should be here understood that the counteracting force transmitted to the unit from the left side of the belt is additive to the normal off-center weight of the unit as mounted upon the motor shaft 41, and the greater the force necessary to operate the machine a proportionally greater counter-acting force will be transmitted to the unit to further tighten upon the belt 43.

It will appear from a consideration of Fig. 2 of the drawing that the entire unit can be quickly and easily detached with respect to the motor shaft 41 by simply loosening the screw 40, thus a new motor may be installed quickly and easily and without disturbing any part of the unit structure. It will be apparent that suitable bearings will be provided for the rotatable parts in the frame as well as for the pulley on the pivot shaft 29. It will also be apparent that by removing the nut 44 at the end of the pivot shaft 29, the frame 31 including the bushing 33 and pinion 38 may be removed from the pulley or the pulley removed from the frame.

By reason of the mounting of the unit upon the motor shaft, it will be apparent that the unit is capable of being positioned with its pivot shaft 29 assuming a position anywhere within 360 degrees about the motor shaft 41, thus adapting the unit to machine installations of any type or kind where the motor may be positioned above, below or at either side of the shaft similar to the shaft 11 upon which the pulley 42 is arranged.

For descriptive purposes, it may be said that the pivot axis of the pulley in the frame is disposed with respect to the axis of the motor shaft in a direction opposed to the direction of rotation of the motor shaft. In considering Fig. 1, it will appear that the motor shaft is driven anti-clockwise, or from right to left, and that the axis shaft 29 is disposed at the right of the motor shaft 41. However, this particular arrangement may be varied in different drives and depending largely upon the relationship between the drive motor and the drive shaft of the machine.

Having fully described my invention, what I claim as new and desire to secure by Letters Patent is:

1. A reduction drive for machines of the class described, said drive comprising a unit adapted for mounting on the shaft of an electric motor, the unit comprising a cup-shaped pulley, an internal gear in said pulley, a frame arranged in the pulley and having a shaft portion forming an axis of rotation of the pulley about said frame, a bearing portion on the frame offset with respect to said shaft, a bushing in said bearing portion, means for coupling a motor shaft with said bushing, the bushing including a protruding stud, means on said stud and on said bushing engaging the frame to retain the bushing against displacement from the frame, and a pinion secured to said stud and meshing with said internal gear.

2. A reduction drive for machines of the class described, said drive comprising a unit adapted for mounting on the shaft of an electric motor, the unit comprising a cup-shaped pulley, an internal gear in said pulley, a frame arranged in the pulley and having a shaft portion forming an axis of rotation of the pulley about said frame, a bearing portion on the frame offset with respect to said shaft, a bushing in said bearing portion, means for coupling a motor shaft with said bushing, the bushing including a protruding stud, means on said stud and on said bushing engaging the frame to retain the bushing against displacement from the frame, a pinion secured to said stud and meshing with said internal gear, said drive also including a pulley arranged on a drive shaft of the machine, a belt for transmitting the rotation of the pulley of the unit to said last named pulley, and the axis of rotation of the pulley of said unit being disposed in a plane substantially at right angles to a plane through the axis of the motor shaft and the axis of said last named pulley.

3. A reduction drive unit of the class described, comprising a cup-shaped pulley defined by a plate, an annular flange extending to one side of the periphery of the plate, the flange forming a chamber within said pulley, an internal gear mounted in the base portion of said chamber adjacent said plate, a hub portion centrally of the plate and having a shaft protruding into the open end of said chamber, a frame arranged in said chamber and to which said shaft is secured, the inner surface of said frame being arranged adjacent said internal gear, the frame having a bearing portion protruding through the open side of said pulley at one side of said shaft, means including a bushing arranged in said bearing for coupling a drive shaft with the bushing and disposed within said bearing, the bushing having a part protruding beyond the inner surface of said frame, and a pinion secured to said part of the bushing and meshing with said internal gear.

4. A reduction drive unit of the class described, comprising a cup-shaped pulley defined by a plate, an annular flange extending to one side of the periphery of the plate, the flange forming a chamber within said pulley, an internal gear mounted in the base portion of said chamber adjacent said plate, a hub portion centrally of the plate and having a shaft protruding into the open end of said chamber, a frame arranged in said chamber and to which said shaft is secured, the inner surface of said frame being arranged adjacent said internal gear, the frame having a bearing portion protruding through the open side of said pulley at one side of said shaft, means including a bushing arranged in said bearing for coupling a drive shaft with the bushing and disposed within said bearing, the bushing having a part protruding beyond the inner surface of said frame, a pinion secured to said part of the bushing and meshing with said internal gear, and means retaining said bushing against movement axially of said bearing.

5. A reduction drive unit of the class described, comprising a cup-shaped pulley defined by a plate, an annular flange extending to one side of the periphery of the plate, the flange forming a chamber within said pulley, an internal gear mounted in the base portion of said chamber adjacent said plate, a hub portion centrally of the plate and having a shaft protruding into the open end of said chamber, a frame arranged in said chamber and to which said shaft is secured, the inner surface of said frame being arranged adjacent said internal gear, the frame having a bearing portion protruding through the open side of said pulley at one side of said shaft, means including a bushing arranged in said bearing for coupling a drive shaft with the bushing and disposed within said bearing, the bushing having a part protruding beyond the inner surface of said frame, a pinion secured to said part of the bushing and meshing with said internal gear, means retaining said bushing against movement axially of said bearing, and the flange portion of said pulley having a convexly rounded surface bordered by circumferential rings.

6. The combination with a machine having a drive shaft and an electric motor for driving the machine, of a belt and pulley drive comprising a pulley on the drive shaft of the machine and a reduction unit mounted entirely upon the shaft of the electric motor, said unit comprising a frame having a central axis, a cup-shaped pulley enveloping the frame and rotatable about said axis, said frame fitting snugly and freely in the open side of said pulley, means comprising a bushing spaced radially with respect to said axis for mounting and coupling the frame on the shaft of an electric motor with the pivot axis of the frame disposed at the side of the motor shaft opposed to the direction of rotation of said motor shaft, said frame being free to swing about said bushing, and means comprising an internal gear on said pulley inwardly of said frame and a pinion on said bushing for transmitting the drive of the motor shaft to said pulley.

7. The combination with a machine having a drive shaft and an electric motor for driving the machine, of a belt and pulley drive comprising a pulley on the drive shaft of the machine and a reduction unit mounted entirely upon the shaft of the electric motor, said unit comprising a frame having a central axis, a cup-shaped pulley enveloping the frame and rotatable about said axis, said frame fitting snugly and freely in the open side of said pulley, means comprising a bushing spaced radially with respect to said axis for mounting and coupling the frame on the shaft of an electric motor with the pivot axis of the frame disposed at the side of the motor shaft opposed to the direction of rotation of said motor shaft, said frame being free to swing about said bushing, means comprising an internal gear on said pulley inwardly of said frame and a pinion on said bushing for transmitting the drive of the motor shaft to said pulley, and means on the bushing retaining said frame against movement axially of said bushing and the motor shaft.

8. A reduction drive unit for transmitting reduced drive from a power source shaft to a drive shaft of a machine, said unit comprising a frame, means centrally of the frame forming an axis, a pulley housing rotatably mounted on said axis and encircling the major portion of the frame, said pulley housing comprising a flanged plate forming a deep chamber opening through one side of the housing, said frame fitting snugly and freely in said housing and having a bearing portion spaced radially with respect to said axis, a bushing mounted in said bearing portion, means at end portions of the bushing retaining the same against axial movement with respect to said bearing portion, the frame being rotatably mounted on said bushing, means for coupling a power source shaft with said bushing to rotate the same in said frame, means providing a drive connection between said bushing and said pulley to rotate the pulley on said first named axis while permitting swinging movement of the frame around the axis of said shaft, and said last named means of the pulley comprising an internal gear arranged between said frame and the plate of said pulley.

9. A reduction drive unit of the class described comprising a pulley, said pulley comprising a plate having a central hub portion, an annular flange at the periphery of the plate forming a deep housing at one side of the plate, the pulley having within the housing adjacent the plate, an internal gear, an annular frame mounted in the housing of the pulley outwardly of said gear and fitting snugly and freely in said housing, a pin in the hub portion of the pulley and extending into said frame centrally thereof for rotatable mounting of the frame in said housing, the frame at one side of said pin having an enlarged bearing portion, a bushing rotatably mounted in said bearing portion, means on the bushing retaining the same against axial movement in said frame, said bushing having an extension into the housing within said internal gear, a pinion on said extension meshing with said internal gear, and means securing a shaft in said bushing.

OTTO J. HUELSTER.

REFERENCES CITED

The following references are of record in the file of this patent:

UNITED STATES PATENTS

| Number | Name | Date |
|---|---|---|
| 1,902,980 | Wilhelm | Mar. 28, 1933 |
| 2,396,860 | Lee | Mar. 19, 1946 |